US007572355B1

(12) United States Patent
Arumugam et al.

(10) Patent No.: US 7,572,355 B1
(45) Date of Patent: Aug. 11, 2009

(54) ELECTROCHEMISTRY USING PERMANENT MAGNETS WITH ELECTRODES EMBEDDED THEREIN

(75) Inventors: Prabhu U. Arumugam, Fayetteville, AR (US); Ingrid Fritsch, Fayetteville, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 841 days.

(21) Appl. No.: 11/031,519

(22) Filed: Jan. 7, 2005

Related U.S. Application Data

(60) Provisional application No. 60/534,772, filed on Jan. 7, 2004.

(51) Int. Cl.
*G01N 27/26* (2006.01)
*B01F 13/08* (2006.01)
*B01J 19/00* (2006.01)

(52) U.S. Cl. ...................... 204/401; 366/273; 366/279; 422/224

(58) Field of Classification Search ......... 366/241–346; 422/224, 225; 204/401
See application file for complete search history.

(56) References Cited

U.S. PATENT DOCUMENTS 4,131,370 A 12/1978 Lawrence et al.
4,882,062 A 11/1989 Moeller et al.
4,911,555 A 3/1990 Saffer et al.
4,936,687 A 6/1990 Lilja et al.
4,983,045 A 1/1991 Taniguchi
5,240,322 A 8/1993 Haber et al.
5,389,218 A * 2/1995 Bonne et al. ................ 205/785
5,586,823 A 12/1996 Carr
5,961,213 A 10/1999 Tsuyuki et al.
6,033,574 A 3/2000 Siddiqi
6,146,103 A 11/2000 Lee et al.
6,357,907 B1 3/2002 Cleveland et al.
6,464,387 B1 10/2002 Stogsdill
6,467,946 B1 10/2002 Gebrian
6,733,244 B1 5/2004 Frisch et al.

(Continued)

FOREIGN PATENT DOCUMENTS

DE 4008577 A1 * 10/1990

OTHER PUBLICATIONS

EPO English language computer translation of the Description in Xie DE 4008577 A1, patent published on Oct. 18, 1990.*

(Continued)

*Primary Examiner*—Alex Noguerola
(74) *Attorney, Agent, or Firm*—Medicus Associates; James Meadows

(57) ABSTRACT

Devices and methods of enhancing mass transport proximate a surface of an electrode immersed in a liquid are disclosed. One aspect of the device comprises an electrode embedded in a sintered or bonded magnetic material. The device is contacted with a solvent containing a redox material dissolved therein. An external voltage or current is applied to the electrode, which external voltage or current is sufficient to enhance mass transport proximate the surface of the electrode. Magnetic field effects can be effectively applied to the microstirring of fluids in conjunction with microelectrochemical systems in a lab-on-a-chip format. Suitable applications include bioassays, drug discovery, and high throughput screening, and other applications where magnetohydrodynamics can enhance chemical detection and/or reagent mixing, which otherwise rely on diffusional processes.

16 Claims, 8 Drawing Sheets

U.S. PATENT DOCUMENTS

2001/0017158 A1 8/2001 Kamholz et al.
2002/0098097 A1 7/2002 Singh

OTHER PUBLICATIONS

"Rare-Earth Magnets" on the Rare-Earth Magnetics home page, downloaded from www.rareearth.org opn Nov. 19, 2008.*

Jahn et al., Field dependence of the thermal remagnetization in sintered hard magnets, Journal of Magnetism and Magnetic Materials 251 (2002) 93-99.*

Sadler, D., et al., "Ceramic Magnetohydrodynamic (MHD) Micropump," in *Proc. SPIE*, vol. 4560, C. Mastrangelo et al. eds., pp. 162-69, Oct. 2001, San Francisco.

Hatch, A., et al., "A Ferrofluidic Magnetic Micropump," *J. Microelectromech. Systems*, 10: 215-221, Jun. 2001.

Suzuki, H., et al., "A Magnetic Force Driven Chaotic Micro-Mixer," *IEEE Transactions on Magnetics*, pp. 40-43, 2002.

Lu, L., et al., "A Magnetic Microstirrer and Array for Microfluidic Mixing," *J. Microelectromech. Systems*, 11: 462-469, 2002.

Bau, H., et al., "Minute Magnetohydrodynamic (MHD) Mixer," *Sensors and Actuators B*, 79: 207-215, 2001.

Zhong, J., et al., "Magneto hydrodynamic (MHD) pump fabricated with ceramic tapes," *Sensors and Actuators A*, 96: 59-66, 2002.

Stroock, A., et al., "Chaotic mixer for microchannels," *Science*, 295: 647-51, Jan. 2002.

Hinds, G., et al., "Influence of magnetic forces on electrochemical mass transport," *Electrochem. Comm.*, 3: 215-18, 2001.

Del Campo, F., et al., "Low-temperature sonoelectrochemical processes Part 1. Mass transport and cavitation effects of 20 kHz ultrasound in liquid ammonia," *J. Electroanal. Chem.*, 477: 71-78, 1999.

Yuan, Z., et al., "The production of Sr hexaferrite thick films by screen printing," *J.Mag. & Mag. Matls.*, 247: 257-69, 2002.

Ragsdale, S., et al., "Magnetic field effects in electrochemistry. Voltammetric reduction of acetophenone at microdisk electrodes," *J. Phys. Chem.*, 100: 5913-22, 1996.

Fahidy, T., "Hydrodynamic models in magnetoelectrolysis," *Electrochim. Acta*, 18: 607-14, 1973.

Leventis, N., et al., "Nd-Fe-B Permanent Magnet Electrodes. Theoretical Evaluation and Experimental Demonstration of the Paramagnetic Body Forces," *JACS*, 124: 1079-1086, 2002.

Pullins, M., et al., "Microscale Confinement of Paramagnetic Molecules in Magnetic Field Gradients Surrounding Ferromagnetic Microelectrodes," *J. Phys. Chem. B*, 105: 8989-8994, 2001.

Waskaas, M., et al., "Magnetoconvection Phenomena: A Mechanism for Influence of Magnetic Fields on Electrochemical Processes," *J. Phys. Chem. B*, 103: 4876-83, 1999.

* cited by examiner

ELECTROCHEMISTRY USING PERMANENT MAGNETS WITH ELECTRODES EMBEDDED THEREIN

REFERENCE TO RELATED APPLICATION

The present application claims the benefit of priority of U.S. Provisional Application No. 60/534,772, filed Jan. 7, 2004, the disclosure of which is incorporated herein by reference.

STATEMENT OF GOVERNMENT SUPPORT

The National Science Foundation (Grant CHE 0096780) has supported, at least in part, development of the present invention. The Government may have certain rights in the invention.

FIELD OF THE INVENTION

The present invention relates to the stirring and pumping of fluids by magneto-hydrodynamics (MHD). It more particularly relates to conducting electrochemistry while using MHD to enhance solution stirring.

BACKGROUND OF THE INVENTION

Many different devices and methods have been proposed for stirring liquids using magnetism. For instance, U.S. Pat. No. 6,464,387 (issued to Stogsdill) discloses a magnetic stirrer provided with a channel and cavity so that when the stirrer is placed in the vicinity of an external rotating magnetic field, liquid is impelled through the channel and downward through the cavity and the stirrer is caused to hover above the bottom of a container for the liquid. Other stirring devices employing one or more rotating permanent magnets have been proposed. See, e.g., U.S. Pat. No. 6,467,946 (issued to Gebrian), U.S. Pat. No. 6,357,907 (issued to Cleveland, et al.), U.S. Pat. No. 5,961,213 (issued to Tsuyuki, et al.), U.S. Pat. No. 5,586,823 (issued to Carr), U.S. Pat. No. 4,911,555 (issued to Saffer, et al.), U.S. Pat. No. 4,131,370 (issued to Lawrence et al.), U.S. Pat. No. 6,033,574 (issued to Siddiqi), U.S. Pat. No. 5,240, 322 (issued to Haber, et al.), U.S. Pat. No. 4,983,045 (issued to Taniguchi et al.), and U.S. Pat. No. 4,882,062 (issued to Moeller et al.).

Most of the aforementioned proposed devices and methods are not suitable for microstirring applications. Previous devices proposed for microstirring applications employ an electromagnet [J. Sadler, et al., *Proc. SPIE,* Vol. 4560 (2001) pp. 162-170] or a permanent magnet [J. Zhong, et al., *Sensors and Actuators A,* 96 (2002) 59-66] placed external to the fluidics device. U.S. Pat. No. 6,146,103 (issued to Lee et al.) discloses an MHD micropump and microsensor that reportedly can generate reversible flow by reversing the direction of electrical current through a micromachined electromagnet. U.S. Pat. No. 4,936,687 (issued to Lilja et al.) reports an apparatus for mixing a suspension of movable magnetic particles in a thin liquid layer. U.S. Patent Publication No. 2001/0017158 of Kamholz et al. report a magnetically actuated fluid handling device that uses magnetic fluid to move a liquid through microsized fluid channels. U.S. Patent Publication No. 2002/0098097 of Singh reports a microfluidic pump that employs a diaphragm and attached magnetic member for moving liquids through a channel into a pump chamber. Some other approaches to stirring small volumes are described by D. Abraham, et al., *Science,* 295: 647-51 (2002) and F. Campo, et al., *Electroanal. Chem.,* 477, 71-78 (1999).

Currently, a need exists for rapid and precise measurements of biological and chemical analytes in low concentrations, particularly in the areas of DNA/RNA detection and analysis, protein identification and analysis, immunoassays, drug discovery, and disease monitoring, e.g., in the fields of medicine, forensics, research and environment protection. Thus, it is necessary to perform chemical synthesis and/or analysis in small spaces where control over mass transport and temperature is greatly enhanced. This also results in tremendous improvements in yields of products, which is of great interest in the pharmaceutical industry, high-throughput analysis, and decrease in use of materials, power, and waste.

It is especially of interest to perform the entire analysis in an integrated and automated fashion. A significant drawback of previous approaches is slow sample transport. It is desired to employ a pump that can move small volumes to various reaction and/or sensing chambers with a decent flow rate. Once the sample reaches a chamber, a solution could mix with other reagents in order to facilitate the reaction. Since the characteristic lengths of these devices are typically 100 μm, which is a flow regime where the Reynolds number is very low and mixing depends upon diffusion. Diffusion by itself cannot provide a rapid mixing; therefore, it is necessary to increase the Reynolds number by creating a turbulent secondary flow by convective means. Additionally, whenever pumping relies on dissolved electrolytes to effect MHD, water electrolysis and bubble formation can occur, which limits flow rate. The present invention is directed toward solving the aforementioned problems.

One objective of the present invention is to provide improved devices for stirring small liquid volumes, which can enhance methods for conducting electrochemistry and the detection of analytes with microelectrodes. A second objective of the invention is to integrate magnets with fluidic channels to realize a chip-based fluidic device. Another objective is to employ redox species having different solubilities and redox potentials to afford applicability to a wider range of samples and solvents.

SUMMARY OF THE INVENTION

The present invention is directed to devices and methods of use for enhancing the stirring of solutions during electrochemistry, e.g., in such applications as analysis, synthesis, separation and detection. In one aspect of the invention, an electrode is positioned adjacent a magnetic material, with only an insulating material separating them to prevent electrical shorting. The separation between electrode and magnetic material is preferably in the range of about 0.01 microns to about 1 mm, more preferably, in the range of about 0.1 microns to about 100 microns. In a preferred embodiment, the electrode-magnetic material device, often referred to herein as a "magneto-electrode", is used in conjunction with a redox material, i.e., a material having a relatively low voltage redox couple, to effect stirring of the diffusion layer proximate the electrode's surface.

In another aspect of the invention, a magneto-electrode device of the invention employs a permanent magnetic material as the aforementioned magnetic material. In other aspects of the invention, the magnetic material can comprise a "soft" magnetic material, i.e., one that does not have a permanent magnetic polarity. The soft magnetic material can be used in conjunction with an adjacent permanent magnetic material, electromagnet or an externally placed permanent magnet to impart a magnetic field in the vicinity of the electrode surface. In yet another aspect of the invention, the magnetic material is integrated with a microfluidic device, e.g., as part of a lab-on-a-chip (LOAC), and stirring of the solution based on "redox MHD" is thereby integrated with solution pumping for analysis, synthesis, separation, and the like.

A device of the present invention has many advantages over previous proposals for solution stirring, including no moving parts, compatibility with biological solutions, bi-directional pumping capability and low voltage requirements, which permits no or less bubble formation. Redox MHD-based microfluidics can be used where a reasonable flow rate with rapid mixing is needed. Microstirring is critical to such current applications as bioassays, drug discovery, and high-throughput screening, since it accelerates mixing in those processes that otherwise would rely on slower diffusional processes.

DETAILED DESCRIPTION OF THE INVENTION

Figure 1:
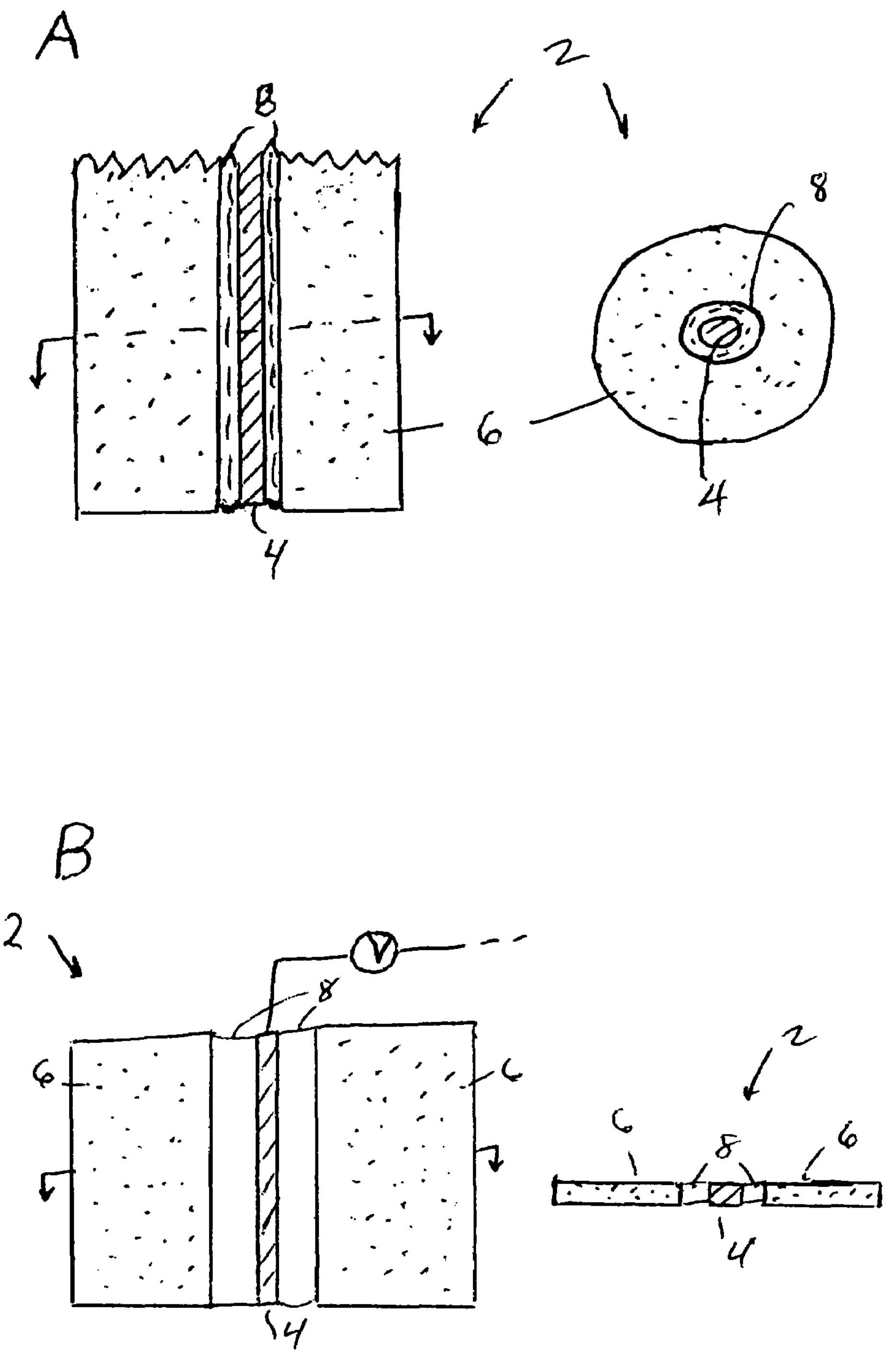
FIG. 1 represents two configurations of a magneto-electrode according to principles of the present invention. Panel A: cross-sectional views of a cylindrical geometry. Panel B: perspective and cross-sectional views of chip-based device.

The present invention contemplates a device for enhancing solution stirring, particularly microstirring, in the proximity of an electrode surface. Such a device comprises an electrode (e.g., microelectrode), a magnetic material, and an insulation material positioned between the electrode and the permanent magnetic material to prevent shorting. The resulting device is sometimes referred to herein as a "magneto-electrode". The spatial separation (gap) between electrode and magnetic material is typically between about 0.01 μm and about 1 mm, more typically between about 0.1 μm and 100 μm.

An electrode of the present invention has thickness dimension in the range of about 10 μm to about 10 mm, more preferably in the range of about 100 μm to about 1 mm. An electrode of the present invention preferably comprises an electrically conductive material, such as Pt, Au, Ag, carbon, or Cu.

A magnetic material of the present invention can comprise a permanent magnetic material, e.g., a ferrite, Al—Ni—Co or rare earth alloy, or combination thereof. Exemplary rare earth alloys include Nd—Fe—B, Sm—Co, and combinations thereof. Alternatively, a suitable magnetic material for use with the invention can comprise a "soft" magnetic material, such as Fe, Co, or Ni, in magnetically susceptible range of a second magnetic source, such as a permanent magnet, an electromagnet. The second magnetic source can provided external the magneto-electrode and surrounding solution, but preferably is provided adjacent the soft magnetic material. Generally, it found that use of a soft magnetic material is preferred to provide enhanced magnetic field focusing.

A permanent magnetic material of the present invention can be a solid magnet or a chemically or physically bonded aggregate of magnetic particles. For a solid magnet, the magnet can be formed by sintering, molding, calendaring, sputtering, evaporation, screen printing, or stencil printing, depending on application. For bonded particles, the magnetic material can be applied as a paste to a substrate in one or more layers, such as through the use of a binder material, such as rubber or flexible thermoplastic resin, rigid thermoplastic or rigid thermosetting resin, e.g., epoxy bonding agent.

A magnetic material of the invention can be provided in a variety of geometric forms and shapes. For instance, it can have a cylindrical or conical shape, such as when a monolithic substance is mechanically bores or shaped to accommodate an internal electrode. Alternatively, it can be in the form of a rectangular solid, such as in a chip format where it is formed by deposition of one or multiple layers of magnetic materials, wherein each layer can comprise the same or different magnetic material.

A device of the invention can comprise a plurality of electrodes embedded, attached, or conjoined with a single magnetic material. As used herein, "embedded" and equivalents thereof, refers to an electrode being positioned closely, without touching, with a surrounding magnetic material, so long as the electrode is permitted physical contact with a solution when in use. Such a device can be prepared, for example, by boring into a magnetic material and inserting an electrode, or it can be formed by using an adhesive substance to adhere a plurality of magnetic particles around the electrode. In order to prevent shorting between the electrode and magnetic material, it is generally preferred that an insulation material is interposed therebetween. The insulation material preferably comprises an organic polymer, e.g., a polyolefin, NYLON, polyethylene, TEFLON, PVC, or polystyrene, or is silicon nitride, glass or air.

A particularly timely and intriguing aspect of the present invention involves use in a so-called "lab-on-a-chip (LOAC)" format. Briefly, LOAC refers to an integrated microfluidic system on a microscale chip, wherein more than one actions, e.g., fluid movement, chemical analysis, synthesis, separation, and detection, are performed with the device. The microchips are made of glass, polymers or silicon, with channels, mixers, reservoirs, diffusion chambers, integrated electrodes, pumps, valves and more, integrated therein. Complete laboratories on a square centimeter have been made. LOAC devices are commonly used for capillary electrophoresis, drug development, high-throughput screening and biotechnological assays. As a result of its many benefits, much new research is done with such devices instead of traditional methods. A magneto-electrode device of the present invention can be incorporated into LOAC microassays, most conveniently by patterning the magneto-electrode onto a suitable substrate, e.g., glass, using standard lithographic techniques, e.g., sputtering, screen printing, and stenciling.

A magneto-electrode device of the invention can be employed with a solvent having nonzero polarity, which is effective in dissolving both the reduced and oxidized states of a redox material, conducting particles, e.g., nanoparticles, and optionally, an electrolyte. A counter electrode, and optionally a reference electrode, can be employed with the magneto-electrode in a system for conducting electrochemistry, as is well-appreciated by those skilled in the art. The redox material facilitates the current-carrying capacity of a solution, permits use of lower voltages, and prevents the electrolysis and bubble formation that can occur when only an electrolyte is used. An electrolyte, e.g., buffer, can be used in many applications of a magneto-electrode of the present invention.

Another aspect of the invention contemplates a method of enhancing mass transport in the proximity of a surface of an electrode immersed in a polar solvent. Such method entails contacting a magneto-electrode of the invention with a polar solvent, which contains a redox material or conducting particles dissolved therein. An external voltage or current is applied to the magneto-electrode. The magnetic effects in proximity to the electrode, the polar solvent, and the redox material interact synergistically under an applied external voltage or current to diminish the diffusion layer and enhance mass transport proximate the surface of the electrode.

As used herein, a "polar solvent", and equivalents thereof, refers to a liquid solvent that has a nonzero dipole moment. Exemplary polar solvents that can be employed with the present invention include, but are not limited to, water, acetonitrile, dimethylformamide, tetrahydrofuran, ammonia, dimethylsulfoxide, and dichloromethane.

As used herein, "redox material", "redox species", and equivalents thereof, refer to a chemical species that is capable of undergoing a change in its electrical charge at a relatively low applied potential, e.g., less than ±1.0V. Exemplary redox species that can be employed with the present invention include, but are not limited to, nitrobenzene, benzoquinone, acetophenone, benzophenone, ferricyanide ion, ferrocyanide ion, ferrocene, ruthenium hexamine, tetramethyl-p-phenylenediamine (TMPD), tetracyanoquinodimethane, dimethylphenazine, 2-2'-bipyridine, ferric ion, ferrous ion, mercuric ion, mercurous ion, cupric ion ($Cu^{2+}$), lead ion ($Pb^{2+}$), cadmium ion ($Cd^{2+}$), dihydroxybenzene (para and ortho), silver ion ($Ag^{+}$), p-aminophenylphosphate, phenol, ascorbic acid, amobarbitol, ethidium bromide, hydrogen peroxide, hydrogen ($H_2$), hydrogen ion ($H^{+}$), and oxygen ($O_2$).

A method of enhancing mass transport according to the present invention is especially of interest for applications involving minute quantities of an analyte or reactant. Examples include mass transport of DNA, RNA, proteins, pathogens, microorganisms, immunoglobulins, small organic molecules, drugs, metal ions, halogen ions, and other materials having a redox couple.

Also contemplated with the invention is a method of conducting an electrochemical reaction, wherein a magneto-electrode of the invention not only enhances mass transport, i.e., stirring, in the vicinity of the electrode surface, but also conducts an electrochemical reaction. Such a method comprises contacting the magneto-electrode with a current-carrying solution containing a redox material dissolved therein. The solution conveniently contains an electrolyte or buffer also dissolved therein. An external voltage or current is applied to the magneto-electrode sufficient to enhance mass transport of reactants proximate a surface of the electrode and to effect the electrochemical reaction, e.g., effect a valence change in an inorganic ion so as to force its precipitation from solution. In a further aspect, the redox material can serve as a charge-carrying intermediate species in the electrochemical reaction, e.g., to reduce or oxidize another species.

The present invention is based on reduction-oxidation (redox) magneto-hydrodynamics (MHD), where interactions between electric and magnetic fields generate Lorentz $F_L$, field gradient, $F_{\nabla}$, and paramagnetic gradient $F_P$ forces that, in turn, create flow (stirring). The addition of redox species to the solution allows for low operating voltages (1 mV-2 V), and therefore extension of electrode life and minimal bubble formation. The use of a small permanent magnet (as opposed to an electromagnet) facilitates portability and does not require power. A current flows when appropriate voltages are applied to an electrode in the redox solution which is mass-transport limited. In cyclic voltammetry (CV), this (limiting) current is determined by the concentration of redox species and the rate at which it reaches the electrode, which is affected by the length of the diffusion layer. If this occurs in the presence of the magnetic field, which has many effects [G. Hinds, et al., *Electrochem. Comm.,* 3: 215-218 (2001)], and if the MHD forces are large enough, convection occurs, and there is a resulting change in the limiting current, which can be used to monitor the stirring. The current change is due to the disruption of the diffusion layer followed by a change in the concentration gradient, $\nabla C$. Thus, in electrochemical studies, mixing is determined when the mass transport-limited current exhibited a change in magnitude after magnetization of the bonded material, compared to before magnetization.

As illustrated in FIG. 1—Panel A, in one aspect of the invention, one or more electrodes are embedded in a magnetic material to place the magnetic field in close proximity to the electrodes. The permanent magnetic material can be a ferrite, Al—Ni—Co, or rare-earth metal-containing magnets. The magnets can be made by sintering, molding or calendaring. Thus, magneto-electrode 2 is formed by electrode 4 being embedded in surrounding magnet 6 with intervening insulation material 8. An advantage of this configuration is the close proximity of the electrode with the magnet. Because of the proximity, an increase in the magnetic forces (Lorentz force or magnetic gradient force), which are responsible for the magneto-convective effects, can be obtained. Results with sintered and bonded magnets show an enhancement in electrochemical signal as large as 85% and 37% in the perpendicular orientation (magnetic field is perpendicular to the electric field). Even in parallel orientation (both electric and magnetic field are parallel) an increase of 30% and 22% is observed. This shows the promise of using magnetic forces, such as Lorentz force, magnetic gradient force and paramagnetic gradient force for microfluidic applications. Electrical shorting between the electrode and magnet can be overcome by interposing an insulation material, e.g., polymer tubing or insulating coating, between them. Also, potential contamination of the solution by direct contact with the magnet can be avoided by covering the magnet with a parafilm or polymeric coating. Previous related work are reported by D. Pullins, et al., *J. Phys. Chem B,* 2001, 105, 8989-8994, and N. Leventis et al., *JACS,* 2002, 124, 1079-1088.

As shown in FIG. 1—Panel B, in a second aspect of the invention, a permanent magnet is fabricated from one or more magnetic pastes [Z. Yuan, et al., *J. Mag. & Mag. Matls.,* 247 (2002) 257-269]. Thus, chip-based magneto-electrode 2 comprises electrode 4 flanked by magnetic layers 6 and separated from the magnetic layers by insulating material 8. An external voltage source is also depicted. Other magnetic materials than ferrites can be used in the magnetic pastes. Here, a permanent magnetic material can be patterned as one or more layers in Low Temperature Co-fired Ceramic tape (LTCC) or High Temperature Co-fired Ceramic tape (HTCC) for MHD based microfluidics. It can also be provided as a layer beneath a microcavity to create a convective flow inside the cavity and thereby enhancing the electrochemical signal and in micromixing two or more solutions within a microfluidic channel. Presently, most MHD-based microfluidic devices use an externally placed electromagnet for creating the Lorentz force and hence the flow. The main disadvantages of this design are bulkiness of the device and limitations in making MHD operational in channels that deviate from a straight line. In the present design, the magnet is integrated with the microchannel and other microstructures, which eliminates bulkiness and permits patterning the magnetic layer in any desired configuration along or in the channel. This patterning ability permits fabrication of complicated channel shapes. In the present design, the paste can be processed very similarly to LTCC or HTCC technology. The utility of the paste depends on the magnetic flux density it can generate for a given volume of material. The fluid flow rate in a channel is directly proportional to the flux density. So for a reasonable flow rate, a reasonable flux density is needed, e.g., approx. 260 gauss for a flow rate of 1.6 μL/min and for a channel dimension of 500 μm×500 μm×24 mm. This can be obtained by using multiple layers of paste. A potential limitation is the number of layers that can be laid by LTCC or HTCC, which can be overcome by optimizing the processing parameters.

The invention is now described with reference to certain examples for purposes of explanation, but not by way of limitation.

EXAMPLES

All chemicals were reagent grade and were purchased from either Aldrich (Milwaukee Wis.) or Sigma (St. Louis, Mo.).

Example 1

Figure 2:
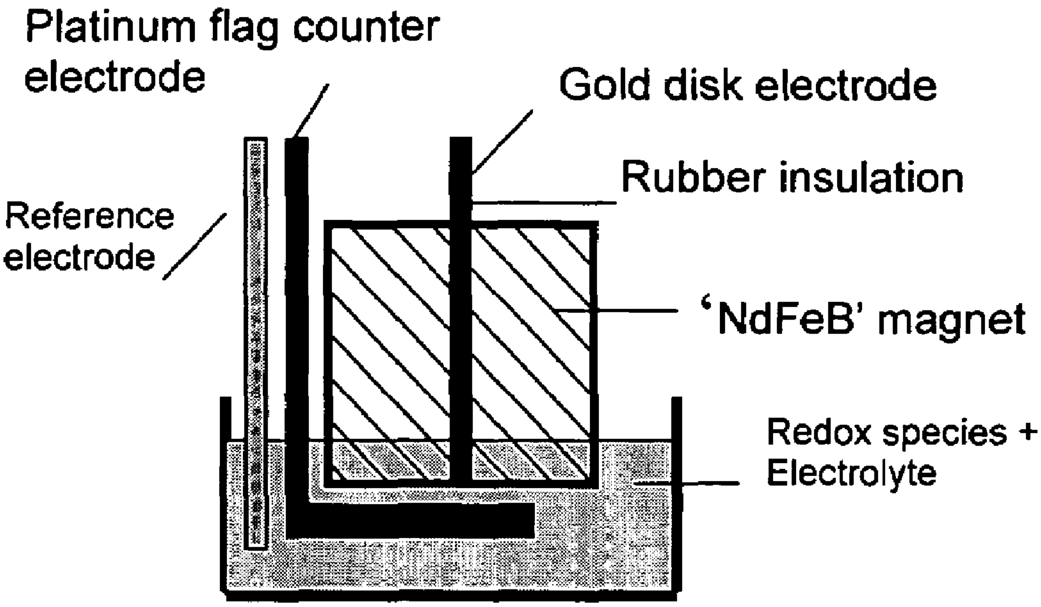
FIG. 2 depicts an experimental setup for an embedded electrode system. Gold wire is used as a working electrode, which is embedded inside a permanent, Neodymium-Iron-Boron ('NdFeB') magnet. The 'NdFeB' is either sintered or bonded.

Magnetohydrodynamic (MHD) effects were studied with a gold disk (380 μm radius) electrode embedded in a permanent magnet using 0.06 M NB in 0.5 M TBAPF6 with acetonitrile solution. Two types of magnets were used for the study; an in-house bonded ($B_r$=0.41 T) and commercial sintered ($B_r$=1.23 T) Neodymium-Iron-Boron ('NdFeB') magnet (e.g., MCE, Inc., Torrance, Calif.). The experimental setup is shown in FIG. 2. The bonded 'composite' magnet was compression molded to a packing density 4.9 g/cc using isotropic spherical 'NdFeB' particles (MQP-S) (Magnequench) and epoxy resin (Epo-Kwick-208138) (Buehler).

Example 2

Figure 3:
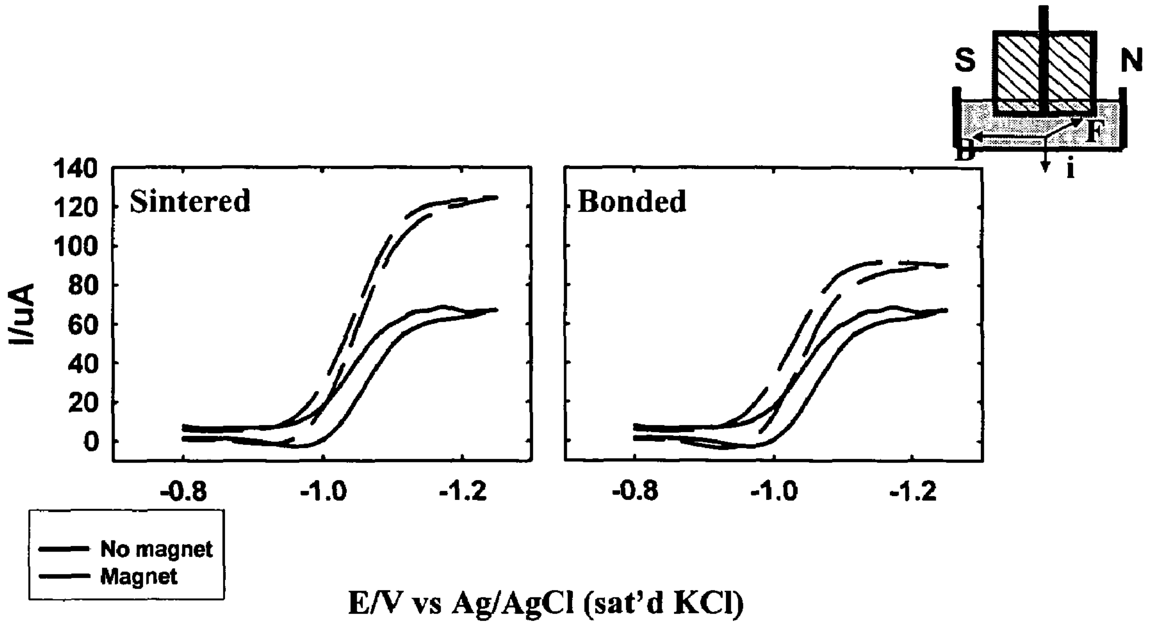
FIG. 3 illustrates the MHD effect on the cyclic voltammetric (CV) response using a 360 μm radius Au wire electrode in a three embedded electrode setup using 0.06 M nitrobenzene (NB) in 0.5 M tetra-n-butylammoinium hexafluorophosphate ($TBAPF_6$) at 5 mV/s. Perpendicular orientations were compared for sintered and bonded permanent magnets: (No magnet) and (Magnet).

Experiments were carried out in both perpendicular and parallel orientations. The results in FIG. 3 suggest that the enhancement of the voltammetric current in the perpendicular orientations is significant. An increase in the current signal represents an increase in mass transport of the reactant, i.e., NB species to the electrode surface. The diffusion-limited current $i_{lim}$, given by Fick's first law, is much lower than the current obtained in the experiments. This demonstrates a third force other than diffusion-driven and natural convection-driven forces is responsible for the increase. The third force is the magnetic body force, which is Lorentz force $F_L$ and paramagnetic gradient force $F_P$ in perpendicular orientation, and all three magnetic forces ($F_L$, $F_P$, and $F_\nabla$, where $F_\nabla$ is magnetic field gradient force in parallel orientation.

Example 3

Figure 4:
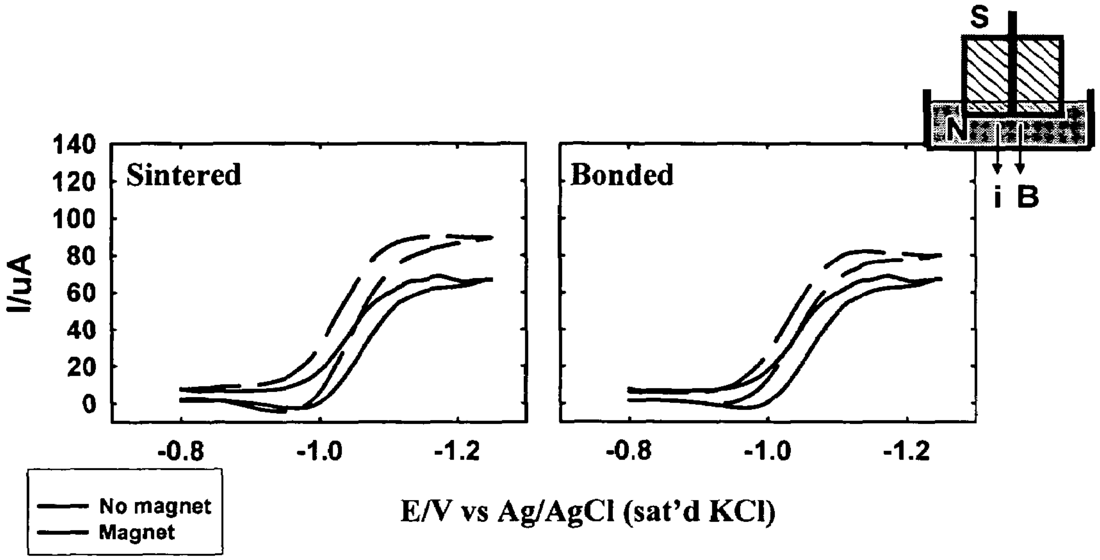
FIG. 4 depicts the MHD effect on the CV response under the same conditions as in FIG. 2, except that parallel orientations were employed for sintered and bonded permanent magnets: (No magnet) and (Magnet).

The same study as in Example 2 was performed in the parallel orientation. The results are shown in FIG. 4. Enhancement of the voltammetric current is again observed.

Example 4

Pt microdisk working electrodes were embedded in bonded NdFeB/epoxy resin material. To construct embedded electrodes in bonded magnets, 125 μm-diameter insulated Pt wires (Goodfellow Cambridge Ltd.) were first spot-welded to copper wires and the joints were insulated using electrical tape. Second, the wire assembly was positioned in a cylindrical aluminum mold (2 cm diameter×4 cm length), a 70:30% vol mixture of MQP-S NdFeB particles (Magnequench, Inc.) with a 5:1 ratio of epoxy resin and hardener (Epo-Thin 208140032 and 208142016, Buehler, Inc.) was poured into the mold, and cured at room temperature for 9 h, resulting in a density of 3.84 g/cm$^3$. The Pt disk electrode was exposed by cutting off the end of the embedded wire and bonded-magnet assembly with a diamond saw (Minitom, Struers Inc) and polishing it with carbide emery paper (600 grit). The surface was inspected by optical microscopy.

Current was generated both before and after magnetization of the assembly at the electrodes using cyclic voltammetry (CV) in solutions containing nitrobenzene (NB) redox species at different concentrations (0.25 M, 0.5 M, 0.75 M, 1.0 M, 1.5 M, 2.0 M and 4.0 M). Cyclic voltammetry (CV) at 5 mV/s in a solution of NB and 0.5 M tetra-n-butylammonium hexafluorophosphate ($TBAPF_6$) electrolyte in acetonitrile was performed at the embedded electrode using an EG&G Princeton potentiostat/galvanostat (Model 273A) before (0 T) and after (~0.13 T on magnet surface) magnetization of the assembly at 4 T. (Magnequench Technology Center, North Carolina) The remenance and coercivity of the bonded magnets is 0.34 T and 2.88 kOe, respectively. A Ag/AgCl (saturated KCl) reference electrode and Pt flag auxiliary electrode were used. Between experiments, the electrodes were polished with 1-μm diamond polish (MF-2054, Bioanalytical Systems), then with 0.05-μm alumina B (40-6353-006, Buehler Inc), and sonicated for 2 min (Bransonic Ultrasonic Cleaner 1510) in deionized water. The magnetic flux density was measured using a GM1A Gaussmeter (Applied Magnetics Laboratory Inc). A HG-600 Hysteresisgraph (Magnetic Instruments Inc) was used for hysteresis measurements (FIG. 4). Kinematic viscosity of NB solution of different concentrations was measured using Cannon-Fenske routine viscometer no 100/193 (Industrial Research Glassware, New Jersey)

Results and Discussion

Figure 5:
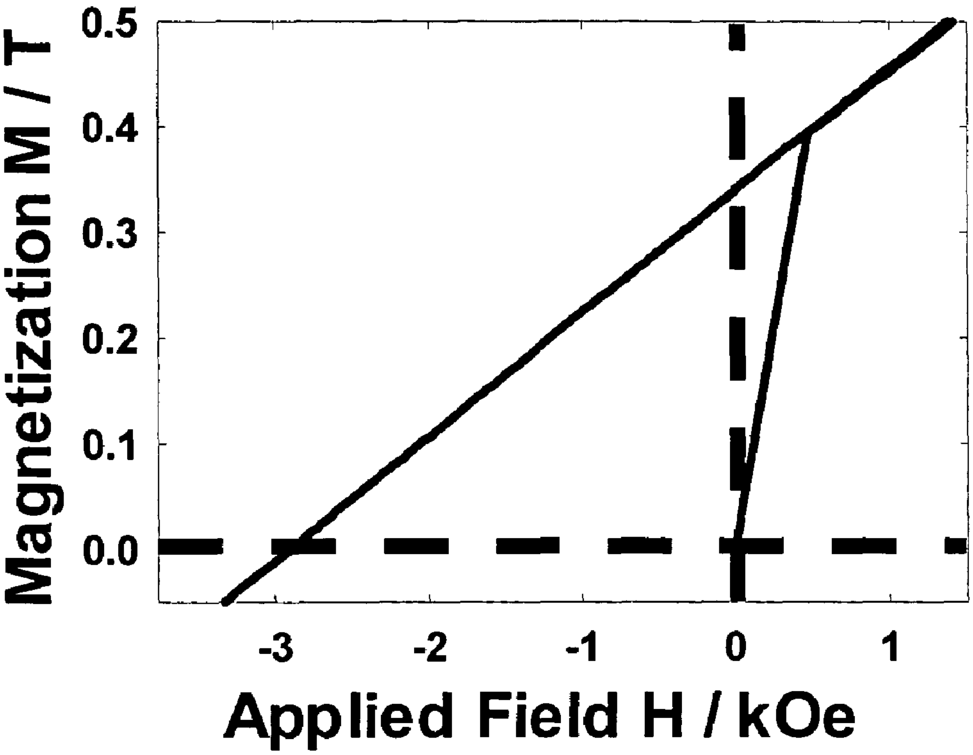
FIG. 5 depicts the hysteresis curve (second quadrant) of a bonded magnet showing that a NdFeB/epoxy material (70:30% vol) displays magnetic properties after magnetization.

FIG. 5 shows the second quadrant of a hysteresis loop obtained from a bonded magnet. The residual induction is 0.34 T and coercivity is 2.88 kOe. CV is performed on the magnet-embedded microelectrodes, which serve as the working electrode. When the potential becomes more negative than the standard reduction potential, a cathodic current is produced, which corresponds to the 1 $e^-$ reduction of NB to the paramagnetic radical anion, Equation 1.

$$NB + e^- \leftrightarrows NB^{\cdot -} \quad (1)$$

The diffusion-limited current at a microdisk electrode with radius, r, in the absence of a magnetic field is given as $$i_{lim}=4nFDC^{*}r \tag{2}$$

where n is the number of electrons transferred per molecule, F is Faraday's constant (96,485 C/mol), D is the diffusion coefficient of NB, and C* ($mol/cm^3$) is the bulk concentration of NB.

In the absence of a magnetic field, the driving force for fluid motion near electrode surface is molecular diffusion, which is due to concentration gradient in the diffusion layer and convective diffusion, which is due to density gradient (natural convection). The natural convection, which exists predominantly in the diffusion layer, arises due to density difference between reactants and products. It is calculated based on Newton's second law and the average density gain in the diffusion layer is $$F_g=\langle C_{NB^{\cdot-}}\rangle_{DL}[t_{PF6-}FW_{PF6-}-t_{TBA+}FW_{TBA+}]|g| \tag{3}$$

where $F_g$ is the average gravitational force density per unit volume of the diffusion layer, $\langle C_{NB^{\cdot-}}\rangle_{DL}$ is one-half of the sum of $C_{NB^{\cdot-}}$ at the two ends of the diffusion layer, $FW_j$ represents the formula weight of species j, and |g| is the acceleration due to gravity (9.81 m $s^{-2}$).

In the presence of a magnetic field, which is generated after the magnetic material has been magnetized, an additional convective diffusion, called "magnetoconvection", is generated. This convection arises due to magnetic forces such as $F_L$, $F_\nabla$ and $F_P$. $F_L$ acts perpendicular to electric and magnetic fields based on right hand rule and are given by $$F_L=J\times B \tag{4}$$

where J is the flux of ions ($C/cm^2$ s) and B is the magnetic flux density (Tesla, T). $F_\nabla$ that acts in the direction of increasing magnetic flux density is given by $$F_\nabla=2C_RN_A[m^2/kT](B\cdot\nabla)B \tag{5}$$

where $C_R$ is the concentration of paramagnetic species, $N_A$ is Avogadro's number and m is the magnetic moment of an isolated molecule, equal to $9.28\times10^{-24}$ J/T for a paramagnetic species with spin=½, k is the Boltzmann constant ($1.381\times10^{-23}$ J/K), and T is the absolute temperature (K).

Similarly, $F_P$ that acts in the direction of increasing $NB^{\cdot-}$ radicals is given by $$F_P=N_A[m^2/kT]B^2\nabla C \tag{6}$$

$F_L$ results in a rotational flow along the electrode circumference. $F_\nabla$ and $F_P$ acts radially in a direction outward from the center toward the edge of the disk electrode. $F_g$ acts axially (along the electrode axis) towards the electrode in the bulk solution (x>δ) and radially away from the center in the diffusion layer (x<δ), where x is the distance normal to the electrode surface and δ is the diffusion layer thickness. Thus, in the diffusion layer, the net magnetic force generates a vortex flow, which pushes the electrogenerated NB radicals along with the surrounding fluid spirally out from the electrode surface. Therefore, in the presence of the magnetic field, the net magnetic force and the natural convective force are parallel to the electrode surface and are in the same direction.

In perpendicular orientation, $F_L$ acts parallel to the electrode surface, which results in a steady flow of solution across the electrode surface and $F_P$ acts radially away from the electrode center. Thus flow driven by $F_L$ and $F_P$ that are in the same direction as natural convective flow driven by density gradients, results in a large increase of limiting current (e.g., FIG. 3).

Figure 6:
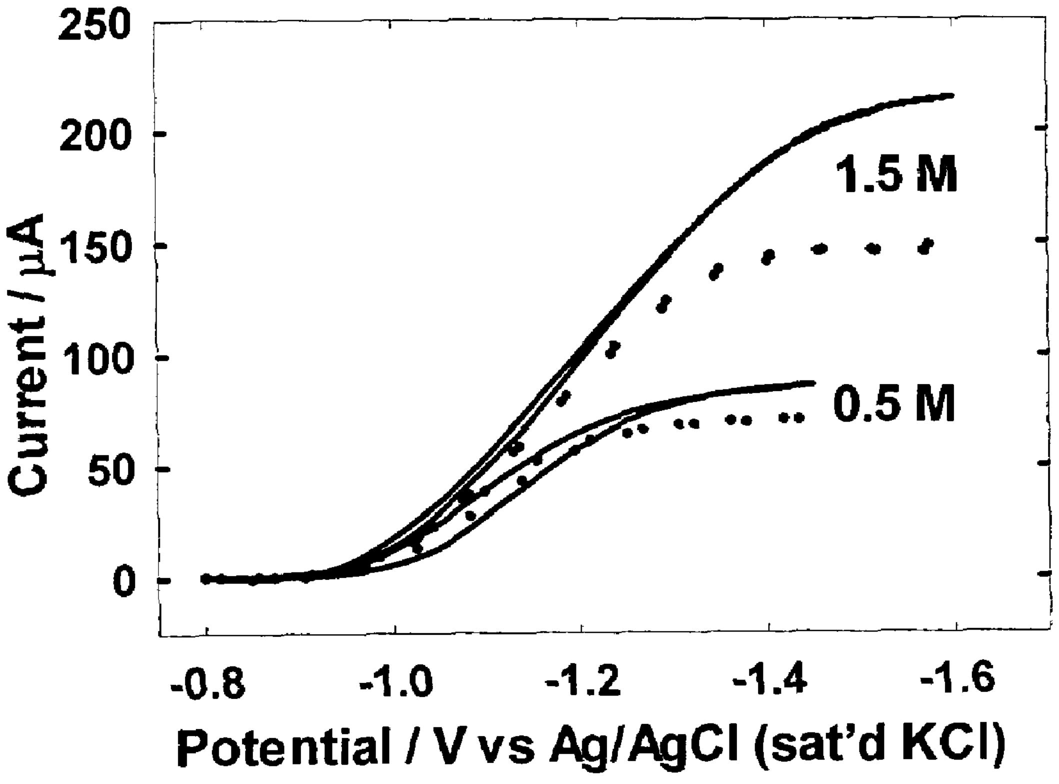
FIG. 6 shows the CV responses at an embedded microelectrode (NB in 0.5 M $TBAPF_6$ at 5 mV/s). CV responses are compared at 0.5 M and 1.5 M NB: before magnetization (dotted curve) and after magnetization (solid curve).

On the other hand, as shown in FIG. 4, in parallel orientation $F_L$ is negligible (J and B are parallel) and the increase in limiting current is due to gradient forces $F_P$ and F Based on the force calculations, $F_\nabla$ is one order of magnitude greater than $F_P$. For the magnet geometry; $F_\nabla$ is directed radially away from the electrode surface (in agreement with the theoretical predictions). The mathematical model for the magnet geometry was developed in MATHEMATICA software (Version 2, Wolfram Research Inc.) The increase in $i_{lim}$ in parallel orientation is believed due to $F_\nabla$ pushing the paramagnetic $NB^-$ The Effect of Redox Concentration on Limiting Currents FIG. 6 shows CV responses at embedded Pt electrode for two different concentrations of NB before and after magnetization of the NdFeB/epoxy material. The presence of the magnetic field produces a higher limiting current $i_{lim,m}$, consistent with an increase in convection due to MHD. At 0.5 M NB, the increase is 22% and at 1.5 M NB, it is 45%.

Figure 7:
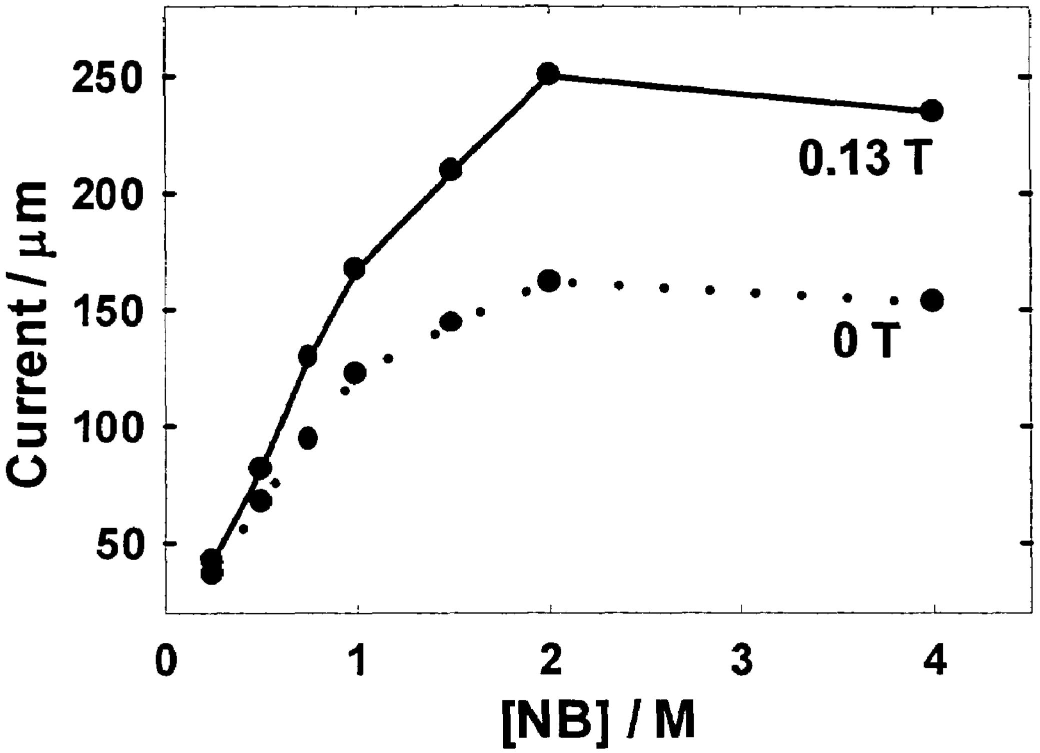
FIG. 7 shows plateau currents from CV responses (5 mV/s) at an embedded, 125 μm diameter Pt electrode in a three-electrode setup for solutions with different concentrations of NB in 0.5 M $TBAPF_6$: before magnetization (dotted curve) and after magnetization (solid curve).

FIG. 7 compares the mass-transport limited current before and after magnetization for NB concentrations up to 4 M. The largest MHD effect was observed at 2.0 M with an increase of 54%. At low concentrations, the net magnetic force is weak and results in a lower change in current. At high concentrations, the net magnetic force becomes large (see Equations 3, 4 and 5), and is parallel to and in the same direction as natural convection, resulting in a larger increase in current. Ideally, as concentration increases, diffusion limited current at 0 T at an electrode increases linearly. This is not the case in FIG. 7. At the high concentrations that were used in these studies, the viscosity of the solution also increases, which decreases the apparent diffusion coefficient of NB, resulting in a nonlinear curve shape. In fact, above 2 M, the current begins to decrease, because the viscosity effect slows diffusion coefficients sufficiently to offset the influence of further increases in concentration. After magnetization of the embedded microelectrode, the same trend of increase in current with concentration is observed, but the slope is greater than prior to magnetization. The steeper increase is due to stirring from MHD, which is enhanced when there is a larger current. Others have noted similar behavior for microelectrodes in an externally-applied magnetic field [S. Ragsdale, et al., *J. Phys. Chem.,* 100: 5913-22 (1996)]. To have a better understanding of this behavior the diffusion 'quiescent' layer thickness, δ, near the electrode surface was studied.

The Effect of Magnetic Field on Diffusion Layer Thickness (δ)

Without wishing to be limited to any particular theory, it is believed that the observed increase in mass transfer in coupled electric/magnetic fields can be explained via a vorticity generation model or equivalent mass transfer models [T. Fahidy, *Electrochim. Acta,* 18:607-614 (1973)]. A flow-past-flat-plate (FPFP) model was employed here to interpret the magnetic field effects by estimating the average diffusion layer thickness. The concept of an equivalent lateral motion instead of a radial outward flow, at and parallel to electrode (V), was introduced. The approach is based on the classical Nernst equation:

$$I_{lim}=nFDAC^{*}/\delta \tag{7}$$

and Levich equation for diffusion flow to the surface of a plate in a flowing fluid:

$$I_{lim,m}=0.68nFD^{2/3}C^{*}r^{3/2}V^{1/2}\nu^{-1/6} \tag{8}$$

assuming electrode height and width is equal to electrode radius. The pertinent boundary layer thicknesses are:

Diffusion (Nernst) layer $\delta \cong 0.6 Pr^{-1/3} \delta_H$ (9)

Hydrodynamic (Prandtl) layer $\delta_H \cong r Re^{-1/2}$ (10)

where A is electrode area, Pr is Prandtl number, a ratio of kinematic viscosity to diffusion coefficient (ν/D), Re is Reynolds number (V r/ν).

Since for non-aqueous liquids, ν/D ~$10^5$, $\delta_H$ is approximately thousand times bigger than δ and convection is more dominant than diffusion. The interplay between δ and $\delta_H$ decides the net increase in the limiting current. $\delta_H$ can be calculated from Equation 10, provided ν and V is known. Using a viscometer ν was measured at different concentrations of NB and from Equation 8, equivalent lateral flow velocity V is calculated.

By substituting the limiting currents for 0 T from CV in Equation 2, diffusion coefficients are calculated. The D calculated, is due to true molecular diffusion (Nernt-Einstein), $D_{true}$, and natural convection, $D_{conv}$. But in the presence of the magnetic field, we have an additional term for the diffusion coefficient due to magnetoconvection, $D_{mconv}$. The effective diffusion coefficient in the presence of a magnetic field is given as $$D_{eff} = D_{true} + D_{conv} + D_{mconv} \quad (11)$$

With the diffusion coefficients known, diffusion layer thickness for non-forced convection (δ*), which is before magnetization of bonded material, may be calculated directly from the observed limiting current (equation 7). The δ* was found to be ~49.2 μm. The diffusion layer thickness for magnetically driven electrodes (MDE) (δ), which is after magnetization of bonded material, may be calculated directly from Equation 9. Table 1 summarizes the calculated and measured values of various parameters.

TABLE 1

| C (M) | D•$10^5$ (cm²/s) | ν•$10^3$ (cm²/s) | $Pr^{1/3}$ | $i_{lim,m}$ (μA) | V (cm/s) | Re | $\delta_H$ (μm) | δ(μm) |
|---|---|---|---|---|---|---|---|---|
| 0.25 | 6.2 | 6.7 | 4.75 | 42 | 2.1 | 1.96 | 45 | 5.6 |
| 0.5 | 5.6 | 6.8 | 4.94 | 81 | 2.21 | 2.04 | 44 | 5.3 |
| 0.75 | 5.2 | 6.9 | 5.11 | 129 | 2.76 | 2.49 | 40 | 4.7 |
| 1.0 | 5 | 7.1 | 5.23 | 167 | 2.77 | 2.43 | 40 | 4.6 |
| 1.5 | 4 | 7.7 | 5.76 | 210 | 2.69 | 2.2 | 42 | 4.4 |
| 2 | 3.4 | 7.8 | 6.13 | 250 | 2.68 | 2.14 | 43 | 4.2 |
| 4 | 1.6 | 8.4 | 8.06 | 235 | 1.65 | 1.23 | 56 | 4.2 |

To check the validity of the Levich equation for microelectrodes, we compared the mass-transfer coefficient m* for 0 T ($m^*_{stat}$) and 0.13 T ($m^*_{MDE,th}$). The $m^*_{stat}$ is given as $$m^*_{stat} = 4D/\pi r \quad (12)$$

and $m^*_{MDE,th}$ is given as $$m^*_{MDE,th} = 0.217 D^{2/3} r^{-1/2} V^{1/2} \nu^{-1/6} \quad (13)$$

For 2 M, the values of $m^*_{stat}$ and $m^*_{MDE,th}$ are 0.007 cm $s^{-1}$ and 0.011 cm $s^{-1}$, i.e. an increase of 57%. In the presence of the magnetic field, the increase in $i_{lim}$ is solely due to an increase in m*. Therefore, $m^*_{MDE,exp}$ was calculated from experimental data and found to be 54%. The negligible difference between $m^*_{MDE,th}$ and $m^*_{MDE,exp}$ suggests that using FPFP model is justifiable. Also calculated was δ from equation 9 (see FIG. 8). For 2 M, it is 4.2 μm. At any Dt value, where t is the time scale of the experiment, r/δ ratio gives the relative importance of non-forced convection to radial diffusion. Before magnetization, r/δ* is 1.3, i.e., radial diffusion, is equally dominant as natural convection. But after magnetization, r/δ is 15, i.e., contribution of radial diffusion is <10% of that of magnetoconvection, edge effects commonly encountered in microelectrodes can be neglected.

Hence, this approach of using of using Levich equation for magnetically driven microelectrodes is a good starting point to explain the magnetic field effects at embedded electrodes. Further investigation is required to know the exact exponents for this potentially useful magnet-electrode configuration. This aspect of finding the exponents should be an inviting area for future theoretical and experimental study.

Figure 8:
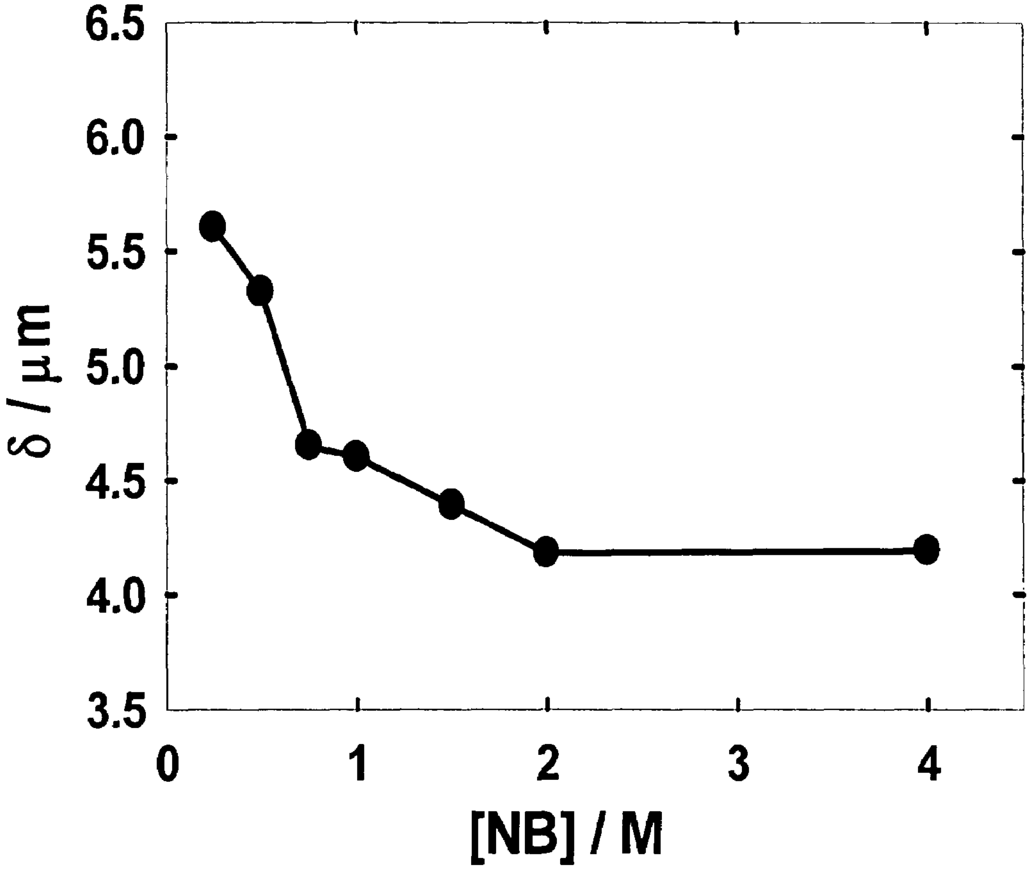
FIG. 8 shows a plot of diffusion layer thickness δ (after magnetization), determined from the limiting current of CV for the reduction of NB at a 125 μm diameter Pt disk electrode at different NB concentrations.

From FIG. 8, the δ values range from 5.6 μm for the lowest concentration to 4.2 μm for the highest concentration in the presence of the magnetic field. This suggests that magnetoconvective effects, which become stronger at higher concentrations, compress the quiescent layer. This layer thinning increases the concentration gradient of NB adjacent to the electrode and thus enhances its flux. If the viscosity is high enough so that the current at 0 T no longer increases, MHD cannot contribute more to convection, either, and the quiescent layer remains unchanged. The thickness of the quiescent layer is important in considering limitations to device dimensions where MHD might be used for stirring on a small scale. Further, a limit of diffusion layer thinning was reached by transforming it to a viscous sublayer, where flow is highly laminar (Re≦1) (see Table 1), and $D_{conv}+D_{mconv}$ is $\propto x^4$. The $4^{th}$ power dependence on x results in a rapid decrease in V and makes the convection extremely negligible, i.e. viscosity starts dominating the mass transport. This suggests that increasing the concentration beyond 2 M makes the transport of molecules by true diffusion only and the magnetic field does not improve the mass transport any further.

CONCLUSION

The present invention shows how magnetic field effects in microelectrochemical systems can be applied to the microstirring of fluids. Magnetoconvective stirring was demonstrated in small volumes (approximately 1 nL solution near the electrode surface based on a diffusion length of 50 μm) for a localized small field of 0.13 T. Microstirring is critical to applications such as hand-held probes for heavy metals, bioassays, lab-on-a-chip, drug discovery, and high-throughput screening because it accelerates the mixing of species to enhance chemical reactions that otherwise would rely on slower diffusional processes. Stirring has been demonstrated based on redox magnetohydrodynamic forces, using a platinum disk electrode (125 μm) embedded in neodymium-iron-boron bonded magnets (a mixture of NdFeB particles and epoxy resin, residual induction=0.34 T).

MHD at such embedded electrodes in permanent magnets promotes fluid mixing near the electrode surface through several convective forces: the Lorentz force, the magnetic field gradient force, and the paramagnetic gradient force. These forces commence when a current is generated at the electrode poised at a voltage that allows oxidation or reduction of redox molecules in the surround solution. Mixing was determined when the mass transport-limited current exhibited a change in magnitude after magnetization of the bonded material, compared to before magnetization. Magnetic field effects were studied by performing cyclic voltammetry (CV) in a solution of nitrobenzene in 0.5 M tetra-n-butylammonium hexafluorophosphate in acetonitrile at different concentrations. The CV responses showed that from 0.25 M to 2.0 M, the limiting current increased as large as 54% because of large magnetic forces parallel to and in the same direction as the natural convection. Above 2M, the solution viscosity in the diffusion layer dominates, resulting in a decrease in current, and hence, less mixing. Embedding electrodes in magnetic materials yields a measurable enhancement of fluid mixing of small volumes (≅1 μL) even at weak magnetic fields of ≅0.13 T. The addition of redox species to the solution permits low operating voltages (1 mV-2V), which favors extension of electrode life and minimal bubble formation. This approach to stirring solutions has potential for use in portable, chip-based chemical systems.

The invention has been described hereinabove with reference to particular examples for purposes of clarity and understanding rather than by way of limitation. It should be appreciated that certain improvements and modifications can be practiced within the scope of the appended claims.

What is claimed is:

1. A device for enhancing solution stirring proximate a surface of an electrode comprising:

an electrode;

a magnetic material; and an insulation material positioned between the electrode and the magnetic material, which insulation material has a thickness in the range of about 0.01 micron to 1 mm and which is effective in preventing electrical shorting between the electrode and the magnetic material, wherein said electrode, magnetic material and insulation material are immersed in a solution containing a polar solvent and a redox material or conducting particles.

2. The device of claim 1, wherein the electrode comprises an electrically conductive material selected from Pt, Au, Ag, C, and Cu.

3. The device of claim 1, wherein the electrode has a diameter in the range of about 10 microns to about 10 mm.

4. The device of claim 1, wherein the magnetic material is selected from a permanent magnetic material or a soft magnetic material augmented by an adjacent permanent magnetic material, an adjacent electromagnetic material, or an externally positioned permanent magnetic material.

5. The device of claim 4, wherein the permanent magnetic material is a sintered magnet or a chemically or physically bonded aggregate of magnetic particles.

6. The device of claim 1, wherein the magnetic material is formed by sintering, molding, calendaring, sputtering, evaporation, screen printing or stencil printing.

7. The device of claim 1, wherein the magnetic material has a cylindrical, conical or rectangular solid shape and is monolithic, layered or multilayered.

8. The device of claim 1, wherein the magnetic material comprises a ferrite, Al—Ni—Co, a rare earth alloy, or a combination thereof.

9. The device of claim 8, wherein the rare earth alloy is an alloy of samarium and cobalt, an alloy of neodymium, iron and boron, or a combination thereof.

10. The device of claim 1, wherein the insulation material comprises a polyolefin, NYLON, polyethylene, TEFLON, polystyrene, silicon nitride, glass or air.

11. The device of claim 1, wherein the insulation material has a thickness in the range of about 0.1 micron to about 100 microns.

12. The device of claim 1, wherein a plurality of said electrodes are embedded or patterned in a permanent magnetic material.

13. The device of claim 1, wherein the electrode and magnetic material are integrated with a microfluidic system.

14. The device of claim 1, wherein the solution contains an electrolyte dissolved therein.

15. The device of claim 1, further comprising a counter electrode.

16. The device of claim 1, further comprising a reference electrode.

* * * * *